United States Patent
Yamada

(10) Patent No.: US 7,472,154 B2
(45) Date of Patent: Dec. 30, 2008

(54) MULTIPLICATION REMAINDER CALCULATOR

(75) Inventor: Kei Yamada, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 793 days.

(21) Appl. No.: 10/444,984

(22) Filed: May 27, 2003

(65) Prior Publication Data
US 2004/0093369 A1    May 13, 2004

(30) Foreign Application Priority Data
Nov. 11, 2002    (JP)    ............... 2002/326774

(51) Int. Cl.
*G06F 7/38*    (2006.01)
(52) U.S. Cl. ................................ 708/491
(58) Field of Classification Search ......... 708/491–492
See application file for complete search history.

(56) References Cited

U.S. PATENT DOCUMENTS

| | | | |
|---|---|---|---|
| 5,448,639 A * | 9/1995 | Arazi | ............... 708/491 |
| 6,321,247 B1 | 11/2001 | Matthews et al. | |
| 6,415,310 B1 * | 7/2002 | Takenaka et al. | ............... 708/491 |
| 6,973,470 B2 * | 12/2005 | Takahashi et al. | ............... 708/491 |
| 2003/0031316 A1 * | 2/2003 | Langston et al. | ............... 380/28 |
| 2003/0033340 A1 | 2/2003 | Asami | |
| 2003/0182340 A1 * | 9/2003 | Horie | ............... 708/491 |

FOREIGN PATENT DOCUMENTS

| | | |
|---|---|---|
| JP | 11-212951 | 8/1999 |
| JP | 2002-007112 | 1/2002 |

OTHER PUBLICATIONS

Cetin et al., Montgomery Multiplication in GF(2k), Apr. 1998, Kluwer Academic Publishers, Boston Manufactured in The Netherlands, pp. 57-69.*
Related U.S. Appl. No. 10/235,541, filed Sep. 6, 2002.

* cited by examiner

*Primary Examiner*—Chat C Do
(74) *Attorney, Agent, or Firm*—Volentine & Whitt, P.L.L.C.

(57) ABSTRACT

In a circuit which adds a partial product $\{\Sigma(A_j*B)*2^j$ $(j=0,\ldots,m-1)\}$ to a provisional remainder u by using a value of inferior m bits (m is an integer not less than 2) of a number to be multiplied A and a multiplier factor B, there is provided a multiplication remainder calculator which shifts inferior m bits of a provisional remainder u by continuously connecting m stages of processing circuits which perform addition of a modulus N and one-bit shift, and calculates a Montgomery product of the number to be multiplied A and the multiplier factor B by repeating this processing, wherein a multiple number of the multiplier factor can be calculated by inhibiting one-bit shift of the processing circuits.

3 Claims, 9 Drawing Sheets

| VARIABLE | A2j+1A2j | u0' u1' | s0 s1 | PROVISIONAL VALUE u | FEEDBACK VALUE v | REMARKS |
|---|---|---|---|---|---|---|
| INITIAL VALUE | 01 | 00 | 11 | 0 | B | SETTING OF B, TP=0 |
| AFTER ONE CLOCK | 10 | 00 | 11 | B | 3B | ADDITION OF 2B |
| AFTER TWO CLOCKS | — | — | — | 3B | — | STORING OF 3B |

TP : RESET IS EXECUTED WITH INITIAL VALUE AND 0 IS SET (PROVISIONAL VALUE u = 0).

PRE-PROCESSING : CALCULATION OF 3B
POST-PROCESSING : DIGIT MATCHING FOR LATER CALCULATION

FIG. 6

| VARIABLE | A2j+1 A2j | u0' u1' | s0 s1 | sel4 | PROVISIONAL VALUE u | v(MSB) | FEEDBACK VALUE v | REMARKS |
|---|---|---|---|---|---|---|---|---|
| INITIAL VALUE | — | — | — | 0 | < R+N | 1 | < R+N | START OF POST-PROCESSING |
| AFTER ONE CLOCK | 00 | 01 | 11 | 1 | < R+N | 0 | < R | SUBTRACTION OF v |
| AFTER TWO CLOCKS | — | — | — | 0 | < R | — | — | STORING IN T1 OR T2 |

SUBTRACTION OF v : v = v − N if v (MSB) = 1

| VARIABLE | sel3 | — | s3 | PROVI-SIONAL VALUE u | FEEDBACK VALUE v | REMARKS |
|---|---|---|---|---|---|---|
| INITIAL VALUE | 01 | | 1 | 0 | N | SETTING OF N, TP=0 |
| AFTER ONE CLOCK | 10 | | 1 | N | 3N | ADDITION OF 2N |
| AFTER TWO CLOCKS | — | | — | 3N | — | STORING OF 3N |

TP : RESET IS EXECUTED WITH INITIAL VALUE AND 0 IS SET (PROVISIONAL VALUE u = 0).

FIG. 11

| VARIABLE | sel3 | s3 | sel5 | PROVISIONAL VALUE u | v(MSB) | FEEDBACK VALUE v | REMARKS |
|---|---|---|---|---|---|---|---|
| INITIAL VALUE | — | — | — | < R+N | 1 | < R+N | START OF POST-PROCESSING |
| AFTER ONE CLOCK | 01 | 1 | 1 | < R+N | 0 | < R | SUBTRACTION OF v |
| AFTER TWO CLOCKS | — | — | — | < R | — | — | STORING IN T1 OR T2 |

SUBTRACTION OF v : v = v − N if v (MSB) = 1

MULTIPLICATION REMAINDER CALCULATOR

BACKGROUND OF THE INVENTION

The present invention relates to a circuit which can perform a multiplication remainder calculation in a Montgomery space at a high speed.

In recent years, the necessity of performing individual authentication has been increased with spread of IC cards, portable terminals and others. In, e.g., a portable terminal used for online shopping, this authentication must be executed within a short time so as not to keep a customer waiting. In such an authentication and others, data is usually encrypted in order to protect personal information. In RSA cryptography or elliptic curve cryptography, which is often used for such encryption, n-bit multiplication remainder calculation is a bottleneck. Thus, the multiplication remainder calculation must be performed at a high speed.

In the simple multiplication remainder calculation, n-bit register is required when it calculate a product of two n-bit values and division is necessary, e.g., 1024 bits is adopted, 2048-bit register is required, and division based on the 1024-bit data is necessary. However, the load of the calculation relative to the division is high, which makes it difficult to perform encryption processing in the short time.

A Montgomery (Peter L. Montgomery) method is famous as a method enabling the multiplication remainder calculation without using the division in the multiplication remainder calculation. In the Montgomery method, calculating a remainder of a product of two numeric values A and B based on a modulus N can be expressed as follows:

$$A*B \pmod{N} \quad \text{(Expression 1)}$$

Meanwhile, consideration is given as to a remainder space (which will be referred to as a Montgomery space hereinafter) of the modulus N using a large numeric value R as the remainder space when the numeric value R forms a prime number with the modulus N (gcd(N, R)=1). The numeric values A and B in Expression 1 are dealt as A'=AR(modN) and B'=BR(modN) in the Montgomery space. Further, a product Mont (A'·B') in the Montgomery space is defined by the following expression:

$$\mathrm{Mont}(A'\cdot B') = A'*B'*R^{-1} \pmod{N} \quad \text{(Expression 2)}$$

Where $R^{-1}$ is an inverse number in the modulus N of the R. A result obtained from Expression 2 is of course a value in the Montgomery space, and hence the following expression can be obtained as different from Expression 1.

$$A*B*R \pmod{N} \quad \text{(Expression 3)}$$

Thus, after obtaining the multiplication remainder in the Montgomery space, the post-processing of multiplying $R^{-1}$ is usually required.

Here, encrypting a message M will be considered on the presumption of RSA cryptography. The message M is a large numeric value expressing a plain text by binary notation. Encryption is executed by exponential calculation of $C=M^e$ (modN). This calculation can be readily executed by repeating the multiplication remainder calculation in the Montgomery space.

$$T1 = R \quad \text{(A1)}$$

$$T2 = \mathrm{Mont}(M, R^2) \quad \text{(A2)}$$

$$\mathrm{for}(j=0; j<k; j++)\{ \quad \text{(A3)}$$

$$\mathrm{if}(ej==1)\, T1 = \mathrm{Mont}(T2, T1) \quad \text{(A4)}$$

$$T2 = \mathrm{Mont}(T2, T2)\} \quad \text{(A5)}$$

$$C = \mathrm{Mont}(T1, 1) \quad \text{(A6)}$$

The above table shows this multiplication remainder calculation. In the table, an expression A1 and an expression A2 are pre-processing in order to utilize the Montgomery space. Of these expressions, the expression A2 converts the message M into a numeric value M' in the Montgomery space. That is, M'=M*R (modN). The FOR sentence in each of the expressions A3 to A5 calculates the e-th power (modn) of M' in the Montgomery space. A result of this calculation is $M'^e = M^e * R$ (modN), and post-processing of the expression A6 is required in order to obtain a final result C. It is to be noted that the expression A4 is a part which forms a cryptogram by using the binary expression of an index e. Furthermore, the expression A5 has a function to make the square of itself and increase the index by a multiple number of 2.

In the expressions A1 to A6, since only the product Mont in the Montgomery space is used, attention should be paid to the fact that no division is directly used when encrypting the message M. As described above, the Montgomery method is an effective technique to calculate RSA cryptograph or the like at a high speed.

Description will now be given as to how division is ingeniously avoided in the Montgomery method. In Expression 2 mentioned above, when the numeric values A and B are expressed as binary numbers each of which is formed by k bits and $R=2^k$ is established, the multiplication remainder calculation can be effected by using a shift register or an adder. At this moment, Expression 2 can be expressed as follows.

$$\mathrm{Mont}(A\cdot B) = 2^{-k} * \{\Sigma(Aj*B)*2j(j=0,\ldots,k-1)\} \pmod{N} \quad \text{(Expression 4)}$$

In Expression 4, although a j-th partial product $(Aj*B)*2^j$ is cumulatively increased in order to calculate the product Mont, a factor $2^{-k}$ is realized by using a shifter at this moment.

$$u = 0 \quad \text{(B1)}$$

$$\mathrm{for}(j=0; j<k; j++)\{ \quad \text{(B2)}$$

$$u = u + AjB \quad \text{(B3)}$$

$$\mathrm{if}(u0 == 1)\, u = u + N \quad \text{(B4)}$$

$$u = u/2\} \quad \text{(B5)}$$

The above expressions represent a method of calculating Expression 4 by binary addition and shift (which will be referred to as a binary addition shift method hereinafter). This method is based on the fact that the modulus N used in RSA cryptography and the like is usually an odd number. The expression B1 indicates that a provisional value u in the calculation is an initial value 0. The expressions B2 to B5 are for sentences, and a subscript j is incremented by 1 from 0 to k−1 and repeated. The expression B3 indicates that a term Aj*B is nested into the provisional value u, and this corresponds to addition according to each term in Expression 4. The expression B4 determines whether the modulus N is added to the provisional value u. Attention should be paid to the fact that the remainder does not vary even if the modulus N and its multiple number are added to the provisional value u. When u0 which is LSB of the provisional value u is 1, the modulus N is added. Since the modulus N is an odd number, u0 which is LSB of the provisional value u becomes 0 as a result of addition. When u0 which is LSB of the provisional value u is 0, addition of the modulus N is not carried out. As a result, addition according to each term advances while u0 as LSB of the provisional value u is constantly 0 (indicating that u is a multiple number of 2). Although the expression B5 divides the provisional number by 2, this can be realized by one-bit shift since the provisional value u is a multiple number of 2. Incidentally, as to the shift factor $2^{\wedge}-1$, the factor becomes $2^{\wedge}-k$ when calculation of the provisional value u is finished. As described above, in the binary addition shift method, Expression 4 can be obtained by repeating the operation of the expressions B2 to B5.

u0' (which will be expressed in this way hereinafter) which is LSB of the provisional value u in the expression B4 can be logically obtained before judgment of the expression B4, i.e., the stage of the expression B3.

$$u0'=u0@(AjB0) \quad \text{(Expression 5)}$$

Here, u0 in the right side is a least significant bit of the provisional value u in the expression B3, and B0 is a least significant bit of the numeric value B expressed in the binary notation. Expression 5 means a logical expression to render u0' (u0 in the expression B4) as LSB of the provisional value u into 0. However, an operator @ means an EOR logic.

As apparent from the above-described calculation, the product Mont in the Montgomery space can be calculated from only addition and shift.

It is to be noted that, as a circuit which executes a calculation based on addition and shift, there is Ser. No. 10/235,541 applied for USPTO on Sep. 6, 2002 by the present applicant.

As described above, the relatively simple processing can suffice because the binary shift addition method renders the least significant bit u0 of the provisional value u into 0, but it is processing for each one bit, which is not efficient.

Thus, as an example to increase the throughput speed by using parallel calculation processing or the like, there is Japanese patent application laid-open No. 7112/2002.

Information processed by, e.g., IC cards or portable terminals is increasing every year, and there is a meaningful demand for reduction in a calculation time with respect to the cipher used in certification or the like. In order to execute the multiplication remainder calculation at a high speed, since the adopting the above-described parallel calculation processing requires a plurality of the same circuits, which results in a large circuit scale.

SUMMARY OF THE INVENTION

The present invention adopts a method of simultaneously processing a plurality of bits in order to execute the multiplication remainder calculation based on the Montgomery method at a high speed. That is, the present invention adopts a method that a plurality of inferior bits of the provisional value u are respectively determined as 0 and right shift is performed for these bits. As a result, a speed of the multiplication remainder calculation based on the Montgomery method can be increased several-fold.

BRIEF DESCRIPTION OF THE DRAWINGS

FIG. 6 is a view showing a content of post-processing when calculating the Montgomery product Mont;

FIG. 11 is a view showing a content of post-processing when calculating the Montgomery product Mont.

DETAILED DESCRIPTION OF THE PREFERRED EMBODIMENTS

Figure 1:
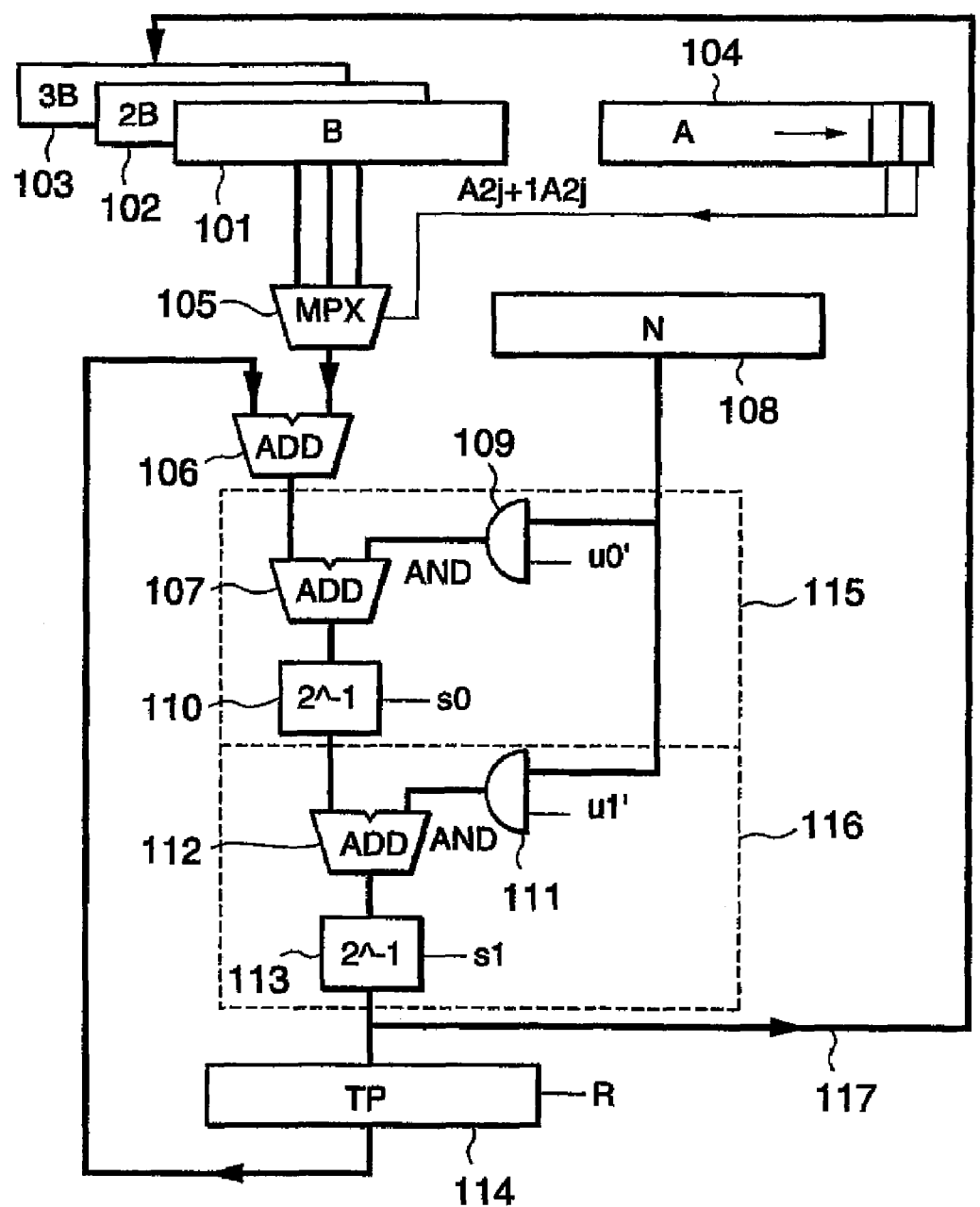
FIG. 1 is a circuit block diagram showing a calculation of a product Mont according to a first embodiment of the present invention.

In a first embodiment according to the present invention, there is disclosed a method of simultaneously processing two bits in the multiplication remainder calculation based on the Montgomery method. When simultaneously processing two bits in the multiplication remainder calculation according to this embodiment, since a partial product may be larger than B in some cases, addition of the modulus N must be carried out in two stages, and processing to judge whether the modulus N is added is complicated.

Expression 4 is first reconfigured into a partial product for each two bits.

$$\text{Mont}(A \cdot B)=2^{\wedge}-k*\{\Sigma(2A2j+1+A2j)*B*2^{\wedge}2j \ (j=0,,,k/2-1)\}(\text{mod} N) \quad \text{(Expression 6)}$$

where k is assumed as an even number.

In Expression 6, the partial product is (2A2j+1+A2j)*B. In order to simultaneously process two bits in the multiplication remainder calculation based on the Montgomery method, the addition for each term must be advanced while always keeping the inferior two bits of the provisional value u to which this partial product is added cumulatively to 0 (which indicates that u is a multiple number of 4). A term (2A2j+1+A2j) may possibly take a value from 3 to 0 when the numeric value A is expressed in the binary notation. Therefore, the partial product has a value from 3 to 0 and is added to the provisional value u. The LSB of the provisional value u (determined as u0) and a bit which is higher than this value by 1 bit (determined as u1) can be a reference for making a judgment upon whether the modulus N is added. In the multiplication remainder calculation based on the Montgomery method, when expressed as a vector(u1, u0), the modulus N is added or shifted so that this vector becomes (0, 0). This is also a method obtained by extending the expression B4 in line 21, page 4, but the shift processing is complicated since two bits are simultaneously processed.

The one-bit right shift in the conventional method is enabled by setting LSB of the provisional value u to 0. In this embodiment, the two-bit right shift is enabled when the vector can be set to (0, 0). However, the carry is generated when adding the modulus N in order to set the first bit u0 to 0, and this carry must be taken into consideration in order to set the next bit u1 to 0.

$$u=0 \quad \text{(C1)}$$

$$\text{for}(j=0;j<k/2-1;j++)\{ \quad \text{(C2)}$$

$$u=u+(2A2j+1+A2j)*B \quad \text{(C3)}$$

$$\text{if}(u0==1)u=u+N \quad \text{(C4)}$$

$$u=u/2 \quad \text{(C5)}$$

$$\text{if}(u0==1)u=u+N \quad \text{(C6)}$$

$$u=u/2\} \quad \text{(C7)}$$

The above expressions show a method of calculating the product Mont according to the first embodiment of the present invention. The expression C1 indicates that the provisional value u in the calculation is an initial value 0. The expressions C2 to C7 are for sentences, and a subscript j is incremented from 0 to k/2−1 by 1 and repeated. However, k is assumed as an even number. A step of this subscript j corresponds to one clock, and processing for two terms is executed in one clock in this example.

The expression C3 indicates that the partial product (2A2j+1+A2j)*B is nested in the provisional value u, and corresponds to the addition for each term in Expression 4. The expression C4 determines whether the modulus N is added to the provisional value u. Attention should be paid to the fact that the remainder does not vary even if the modulus N and its multiple number are added to the provisional value. When u0 which is LSB of the provisional value u is 1, the modulus N is added. Since the modulus N is usually an odd number, u0 which is LSB of the provisional value u becomes 0 as a result of addition. When u0 which is LSB of the provisional value u is 0, the modulus N is not added. As a result, processing advances to the expression C5 while keeping u0 which is LSB of the provisional u as 0 (which indicates that u is a multiple number of 2).

u0 which is LSB of the provisional value u in the expression C4 can be logically obtained before judgment of the expression C4, namely, on the stage of the expression C3.

In order to clarify the logic, the following expression is newly used in the right side of the expression C3:

$$B=2B1+B0 \text{ and } u=2u1+u0$$

Then, the expression C3 can be expressed as follows:

$$u=4A2j+1B1+2(u1+A2jB1+A2j+1B0)+(u0+A2jB0) \quad \text{(Expression 7)}$$

The first term in Expression 7 gives a bit 2 whose digit is higher than the provisional value u by one, and hence it can be ignored. This third term determines the new u0 in the left side (which will be expressed as u0' hereinafter). The addition of the third term is equivalent to the following logical expression.

$$u0'=u0@(A2jB0) \quad \text{(Expression 8)}$$

The logical expression of Expression 8 determines whether the modulus N is added in order to set u0 which is LSB of the provisional value u to 0. This u0' corresponds to u0 which is LSB of the expression C4. However, an operator @ means an EOR logic.

The expression C5 divides the provisional value by 2. This can be realized by one-bit right shift and processed by changing a connection. Attention should be paid to the fact that expression of the provision value u and its digit number are not changed at all in the addition for each term at that time. As a result of shift, LSB of the provisional value u changes from the bit u0' to the bit u1' which is higher than the former by one digit.

The expression C6 is provided in order to again set LSB of the provisional value u to 0, and its method is carried out by adding the modulus N to the provisional value u. The logical expression representing which case that the bit u1' becomes 1 is somewhat complicated by taking the carry into consideration. Considering the fact that the carry necessarily occurs when the second term in the right side of Expression 7 and the modulus N are added, a new provisional value u relative to the provisional value u in the expression C5 can be expressed as follows as a result of shift:

$$u=u1+A2jB1+A2j+1B0+(N1+1)u0' \quad \text{(Expression 9)}$$

where N1 is a second bit of the modulus N.

When this is substituted by the logical expression, attention is paid to LSB in the right side of Expression 9 and the carry is ignored. Then, the following expression can be obtained:

$$u1'=u1@A2jB1@A2j+1B0@N1\_u0' \quad \text{(Expression 10)}$$

This u1' corresponds to u0 which is LSB in the expression C6. However, N1_ is a NOT logic, and an operator @ means an EOR logic.

FIG. 1 is a circuit block diagram showing a calculation of a product Mont according to the first embodiment of the present invention. In this circuit block diagram, the method of calculating the product Mont shown in the expressions C1 to C7 is realized substantially as it is. In order to calculate the partial product, a numeric value 3B is set in a register 103 in advance, as well as the numeric value B set in a register 101. A numeric value 2B set in the register 102 can suffice by performing one-bit shift of the numeric value B set in the register 101 by using the connection. The numeric value 3B must be previously calculated on the initial stage of the multiplication remainder calculation. After calculation of the Montgomery product Mont based on Expression 4, digit matching is performed as post-processing. This will be described in connection with a second embodiment according to the present invention.

Figures 2, 3:
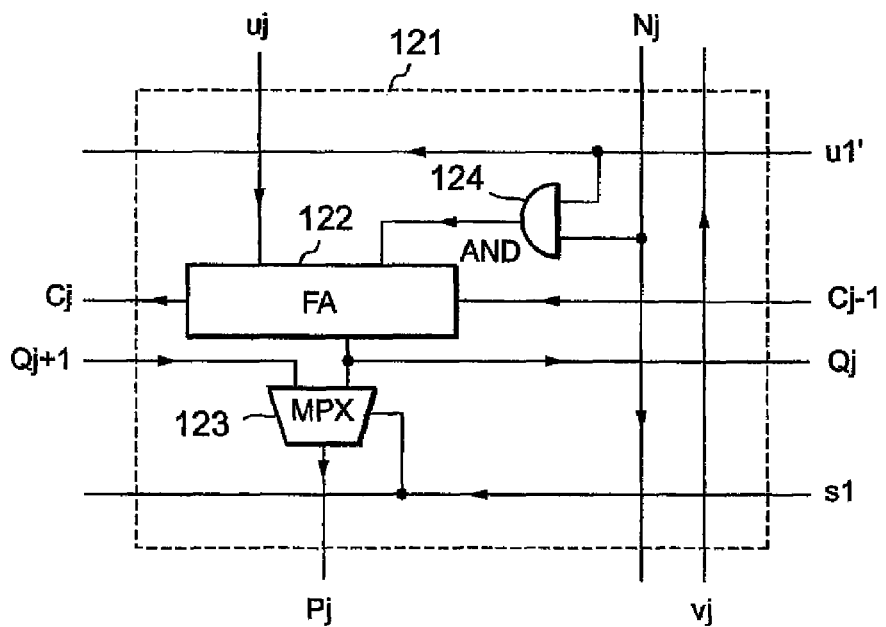
FIG. 2 is a chart showing a calculation when executing a calculation of a numeric value 3B.
FIG. 3 is a circuit diagram for one bit of a control circuit according to the first embodiment of the present invention.

FIG. 2 is a chart showing an example of a calculation table used in calculation of the numeric value 3B. As an initial value, the two-bit right shift register 104 is set as (A2j+1,A2j)=(0, 1), and a temporary register TP 114 is set at that moment. Thus, the provisional value u becomes 0, and an output value B from a multiplexer 105 becomes an input to an adder 106. Further, each of AND gates 109 and 111 which determine whether addition of the modulus N is performed has a control signal being (u1', u0')=(0, 0), and hence addition is not carried out. Furthermore, since each of one-bit right shifters 110 and 113 has a control signal being (s1, s0)=(1, 1), shift is not executed. Thus, a feedback value v becomes the value B after addition using adders 106, 107 and 112. After one clock, the feedback value v is set in the temporary register TP 114, and the new provisional value u becomes B. Then, after one clock, the two-bit right shift register 104 is set as (A2j+1,A2j)=(1, 0). Since the control signal (u1', u0') and the control signal (s1, s0) keep having the same values, the feedback value v after addition becomes the value 3B based on addition of a new output value 2B from the multiplexer 105 and the value B of the provisional value u. The feedback value v is stored in the register 103 in the next clock, and calculation of the Montgomery product Mont is prepared. It is to be noted that the temporary register TP 114 is again reset and the provisional value u is set to 0 in advance.

The method of calculating the Montgomery product Mont will now be disclosed with reference to FIG. 1. The register 104 which stores therein the numeric value A is the two-bit right shift register, and performs two-bit right shift in accordance with one clock, namely, each subscript j in the expression C2 in FIG. 2. As a result, the inferior two bits of the numeric value A are taken out in the form of $A_{2j+1}A_{2j}$ (j=0, ..., k/2−1). The multiplexer 105 selects any of the registers 101, 102 and 103 based on the inferior two bits of the numeric value A. The selected value is $(2A_{2j+1}+A_{2j})*B$, and this value becomes any of 3B to 0. The adder 106 adds the provisional value u and an output value from the multiplexer 105 (this corresponds to the expression C3).

The processing circuit 115 which sets LSB of the provisional value u to 0 executes processing to add the modulus N stored in the register 108 to the provisional value u. Although whether the modulus N is added is determined by a variable u0' in Expression 8, the variable u0' can be determined immediately after start of addition in the adder 106 based on the structure of Expression 8. In the adder 107, the modulus N is added to the provisional value u only when u0' is 1 (which corresponds to the expression C4). As a result of addition, LSB of the provisional value u becomes 0, and one-bit right shift can be executed by using the one-bit right shifter 110 (control signal s0 has a value 0). Consequently, the one-bit right shifter 110 provides a new provisional value u (this corresponds to the expression C5).

A processing circuit 116 used to set LSB of the provisional value u to 0 executes processing of adding the modulus N stored in the register 108 to the provisional value U. Although whether the modulus N is added is determined by a variable u1' in Expression 9, the variable u1' can be determined immediately after start of addition in the adder 107 based on the structure of Expression 10. In the adder 112, the modulus N is added to the provisional value u only when u1' is 1 (this corresponds to the expression C6). As a result of addition, LSB of the provisional value u becomes 0, and one-bit right shift can be performed by using the one-bit right shifter 113 (this corresponds to the expression C7). Consequently, the one-bit right shifter 113 outputs the provisional value u (control signal s1 has a value 0), and its values is stored in the temporary register TP 114 as a new provisional value u.

Upon completion of k/2 clocks by the circuit shown in FIG. 1, an output from the one-bit right shifter 113 provides the product Mont in Expression 6. In calculation of the Montgomery product Mont, one stage of the processing circuit is increased in terms of a circuit amount in the first embodiment according to the present invention, but the calculation speed is doubled because processing for each two bits can be executed. Although there is a disadvantage that the numeric value 3B is calculated in advance, this complies with the demand of executing the multiplication remainder calculation at a high speed.

Although the detail of the FIG. 1 circuit is eliminated for explanation of the calculation, this circuit actually uses the adders for multiple bits 106, 107 and 112, the AND gates 109 and 111, and the one-bit right shifters 110 and 113. Description will now be given as to a structural example of the control circuit 116 with reference to FIG. 3.

FIG. 3 shows a circuit 121 for one bit (j-th bit) of the control circuit 116. Its major constituent part is a full adder FA 122 which adds one bit $u_j$ of the provisional value u, one bit $N_j$ of the modulus N and a carry $C_{j-1}$ from the previous stage and generates an addition value $Q_j$ and a carry $C_j$ for the next stage. Whether addition of the one bit $N_j$ of the modulus N is performed depends on a value of the control signal u1', and controlled by the AND gate 124. The addition value $Q_j$ is not outputted as it is, but selection with an addition value $Q_{j+1}$ on the next stage is carried out in the multiplexer 123. A control signal s1 from the multiplexer 123 corresponds to a selection of the one-bit right shift because the addition value $Q_{j+1}$ on the next stage is selected when a value of the control signal s1 is 0. Since the addition value $Q_j$ is selected when a value of the control signal S1 is 1, the control signal s1 has a meaning as a shift inhibiting signal after all.

The structure that the j-th bit $v_j$ of the feedback value v is included in the circuit corresponding to one bit is mainly based on the consideration of the wiring. Since laying the multi-bit wiring increases the chip size of LSI, this structure is the ingenuity to avoid such an increase.

A second embodiment according to the present invention will now be described. The second embodiment according to the present invention concerns the calculation of the e-th power of the message M ($C=M^e$).

$$T1=R \qquad (A1)$$

$$T2=Mont(M,R^2) \qquad (A2)$$

$$for(j=0;j<k;j++)\{ \qquad (A3)$$

$$if(e_j==1)T1=Mont(T2,T1) \qquad (A4)$$

$$T2=Mont(T2,T2)\} \qquad (A5)$$

$$C=Mont(T1,1) \qquad (A6)$$

As apparent from the above calculation, the Montgomery product Mont repeatedly uses its argument (T1 or T2). Thus, it is possible to consider the method which substantially improves the speed of the calculation by providing new registers (T1 and T2).

Figure 4:
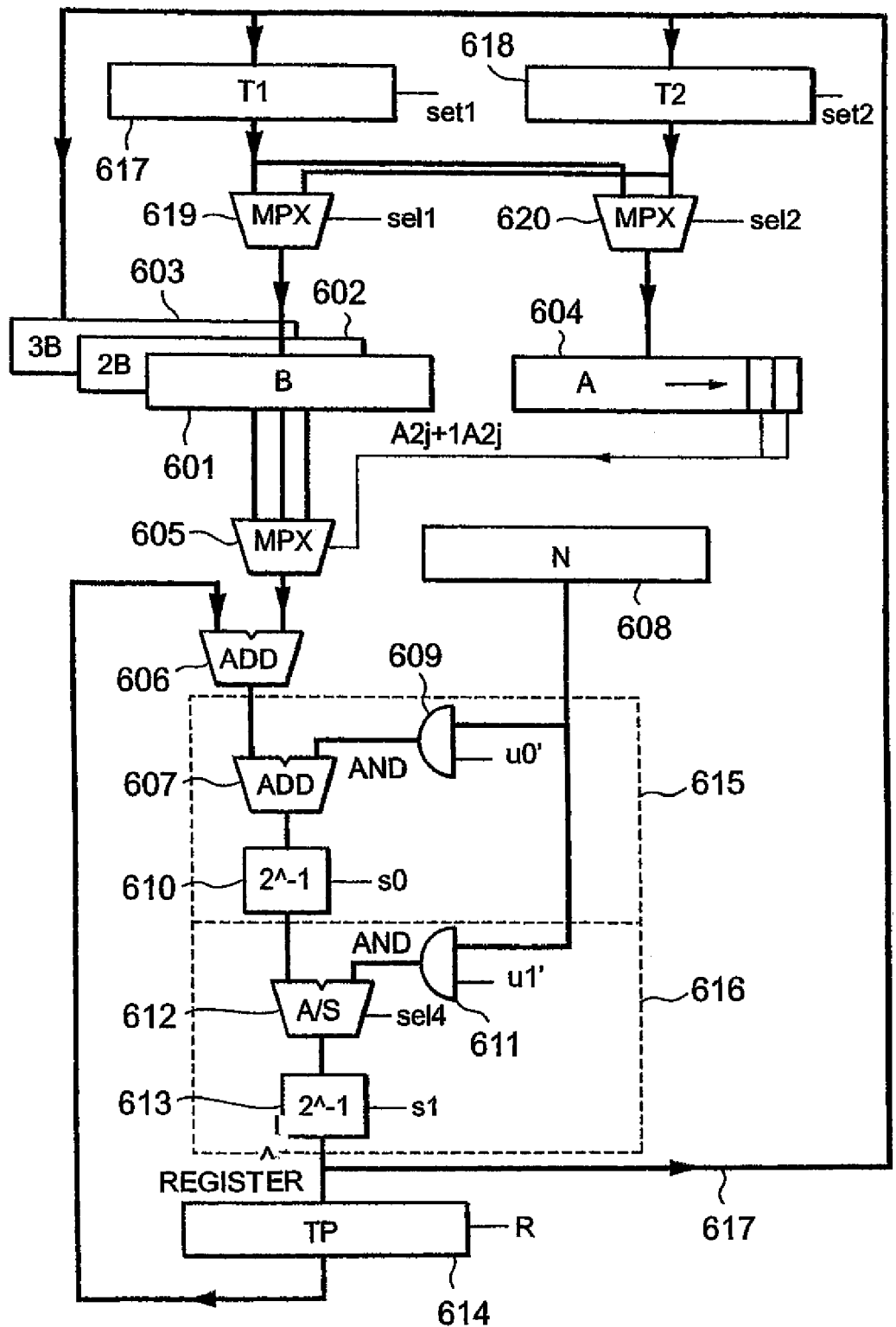
FIG. 4 is a circuit block diagram showing a calculation of an e-th power of a message M according to a second embodiment of the present invention.

FIG. 4 is a circuit block diagram illustrating calculation of the e-th power of the message M of the second embodiment according to the present invention. The second embodiment basically has a structure that a T1 register 617, a T2 register 618, a multiplexer 619, and a multiplexer 620 are added to the FIG. 1 circuit which is the first embodiment according to the present invention. A latch signal set1 is used to set the T1 register 617, and a latch signal set2 is used to set the T2 register 618, respectively. A selection signal sel1 is used to carry out selection in the multiplexer 619, and a selection signal sel2 is used to perform selection in the multiplexer 620, respectively. Since processing circuits 615 and 616 respectively correspond to the processing circuits 115 and 116 in FIG. 1, the accumulated output from the one-bit right shifter 613 of the processing circuit 616 provides the product Mont in Expression 6. Therefore, when calculating the e-th power of the message M in the calculation shown in lines 4-9, page 18, data to be supplied to the T1 register 617 and the T2 register 618 is frequently set in the calculation of the expressions A4 and A5 in the FOR sentences in particular.

$$T1=R \qquad (D1)$$

$$T2=Mont(M,R^2) \qquad (D2)$$

$$for(j=0;j<k;j++)\{ \qquad (D3)$$

$$if(e_j==1)T1=Mont(T2,T1) \qquad (D4)$$

$$T2=Mont(T2,T2) \qquad (D5)$$

$$else\ T2=Mont(T2,T1) \qquad (D6)$$

$$T1=Mont(T1,T1)\} \qquad (D7)$$

$$C=Mont(T1,T1) \qquad (D8)$$

The above expressions is a method of calculating the e-th power of the message M, and this is different from the method disclosed in the expressions A1 to A6 in that the calculation time is uniformized irrespective of a value of e. That is, the expressions D1 to D5 and D8 correspond to the expressions A1 to A5 and A6, respectively. A different point is that the expressions D6 and D7 which are else sentences are inserted when the condition of the if sentence is not satisfied. The both expressions are configured so as not to vary the calculation time even if the if sentence is executed or the else sentence is executed. The calculation time is uniformized for the purpose of avoiding leakage of information. There is a technique which acquires data concerning key information e from the periodicity of noises leaking from a signal line on the assumption that the cipher constituted by the calculation shown in lines 4-9, page 18, is transmitted through the signal line. In order to avoid such a leakage in a manner, the above-described calculation method is adopted. The second embodiment according to the present invention has a circuit configuration which is efficient in the calculation of frequently counterchanges the registers (T1 and T2) as described in the expressions D1 to D8.

In the second embodiment according to the present invention, a bit length of data to be processed must be taken into great consideration. The bit length of data directly concerns the size of the register. As apparent from a loop constituted by the adder 606 and the processing circuits (615 and 616) in FIG. 4 and the provisional value u, the following relationship can be achieved between the maximum value umax of the provisional value u, the multiplier factor B and the modulus N.

$$\text{umax} \leq \{(\max(0, B, 2B, 3B) + u + N)/2 + N\}/2 \quad \text{(Expression 11)}$$

When $R = 2^{1024}$ is established in Expression 2, 3B is a maximum value of the MPX 605 and consists of 1024+2 bits and N is the modulus and consists of 1024 bits in Expression 11. Further, based on the relationship of u<R, B<R and N<R, the following relationship can be achieved from Expression 11.

$$u < N + R \quad \text{(Expression 12)}$$

Therefore, in order to perform matching based on the bit length, u must be a provisional value and consist of 1024+1 bits. There is no problem even if the provisional value u has 1024+1 bits. That is because the relationship of Expression 12 can be again maintained even if the provisional value u is increased by one bit in Expression 11 by Expression 12. In the calculation of the next Montgomery product Mont, however, there occurs an overflow problem that the feedback value v has 1024+1 bits numeric value although T1 or T2 registers 1024 bits.

Figure 5:
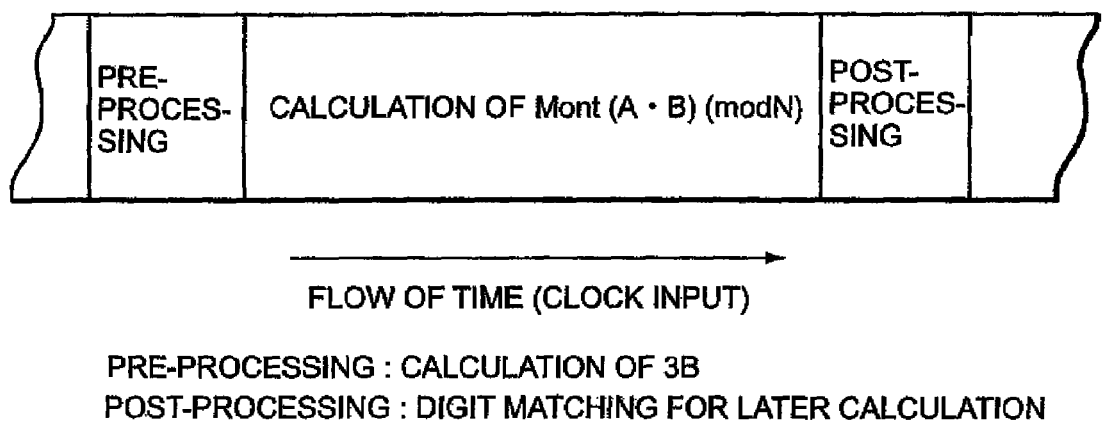
FIG. 5 is a view showing a calculation procedure when calculating a Montgomery product Mont.

FIG. 5 is a conceptual view showing the calculation procedure of the Montgomery product Mont. Post-processing is added in the calculation procedure of the Montgomery product Mont because of the above-described problem. In order to solve this problem in terms of the circuit, the processing circuit 616 in FIG. 4 adopts the structure different from that of the processing circuit 116 in FIG. 1. An adder/subtracter 612 of the processing circuit 616 illustrated in FIG. 6 corresponds to this structure, and the modulus N can be subtracted from the provisional value u by using a control signal sel4. As a result, the relationship of u<R can be maintained with respect to the provisional value u, and there is no problem in calculation of the next Montgomery product Mont.

FIG. 6 is a chart showing the value of the register in the calculation of the post processing. The detailed content of post-processing will now be described hereinafter with reference to FIG. 6. Upon completion of a certain measure of the calculation of the Montgomery product Mont, the feedback value v cannot be stored in the register T1 or T2 as it is in some cases. This occurs when MSB of the feedback value v is 1, which means that a value of the feedback value v exceeds R. Accordingly, in this case, processing to subtract the modulus N from the feedback value v is performed. When v (MSB) is 1 as an initial value after calculation of the Montgomery product Mont, the post-processing is started. The feedback value v after one clock is stored in the temporary register TP 614, and this value becomes the provisional value u. At this moment, when the two-bit right shift register 604 is set so as to establish (A2j+1,A2j)=(0, 0), addition of the multiplier factor is not executed in the adder 606, and the provisional value u is inputted to the processing circuit 615 as it is. Since the control signal is set so as to achieve (s1,s0)=(1, 1) in each of the one-bit right shifter, its shift is prohibited. In the processing circuit 616, the calculation to subtract the modulus N from the provisional value u is executed. When the control signal sel4 has a value 1, subtraction is selected in the adder/subtracter 612. The subtraction is a complement calculation of 2 which involves an input carry value 1. As a result of this calculation, the provisional value u after two clocks can maintain the relationship of u<R, thereby enabling storing the value in the register T1 or T2.

Figure 7:
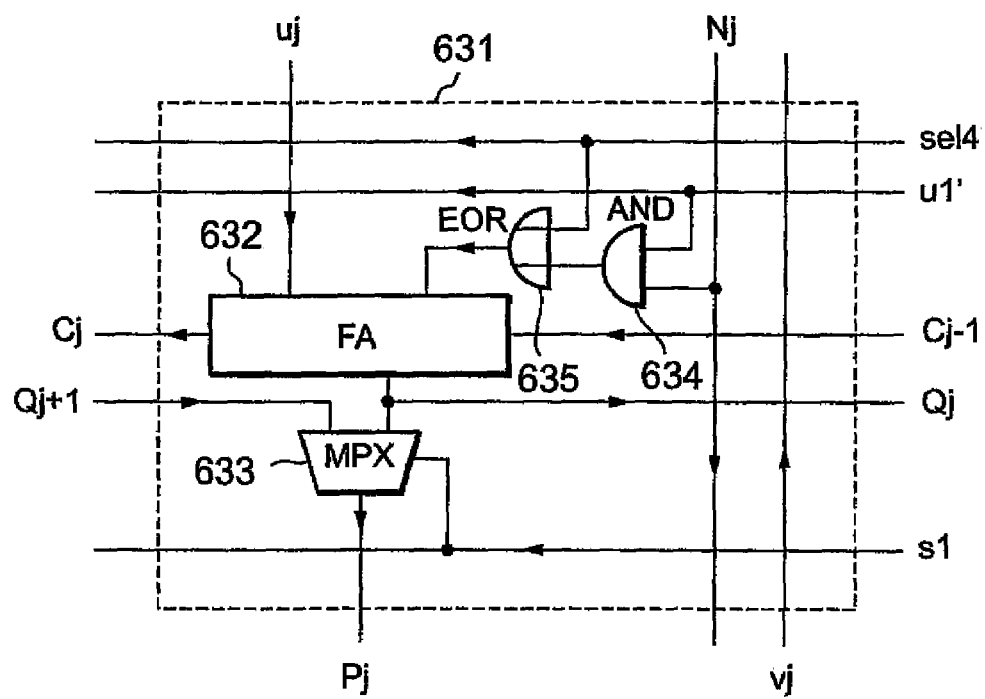
FIG. 7 is a circuit diagram showing a control circuit illustrated in FIG. 6 for one bit.

FIG. 7 shows a structure of a circuit 631 corresponding to one bit (j-th bit) of the control circuit 616. A main constituent part in this structure is a full adder FA 632 which executes addition of one bit uj of the provisional value u, one bit Nj of the modulus N and a carry Cj-1 from the previous stage and generates an addition value Qj and a carry Cj for the next stage. Whether addition of one bit Nj of the modulus N is executed is dependent on a value of the control signal u1' and controlled by an AND gate 634. The addition value Qj is not outputted as it is, but selection with the addition value Qj+1 on the next stage is effected in the multiplexer 633. Since the addition value Qj+1 on the next stage is selected when the control signal s1 of the multiplexer 633 has a value of 1, this means that the one-bit right shift is selected. The addition value Qj is selected when the control signal s1 has a value of 0.

A difference between the circuit shown in FIG. 7 and the circuit shown in FIG. 3 lies in addition of a new EOR gate 635 and a signal sel4 which controls this gate. The control signal sel4 selects subtraction when its value is 1, and selects addition when its value is 0. An output from the AND gate 634 is not directly inputted to the full adder FA 632, but it is inputted through the EOR gate 635. This means that a bit inversion output of the modulus N is created in order to execute the complement calculation of 2. Addition of the inversion output which involves the input carry value 1 means addition of a numeric value (−N).

Figure 8:
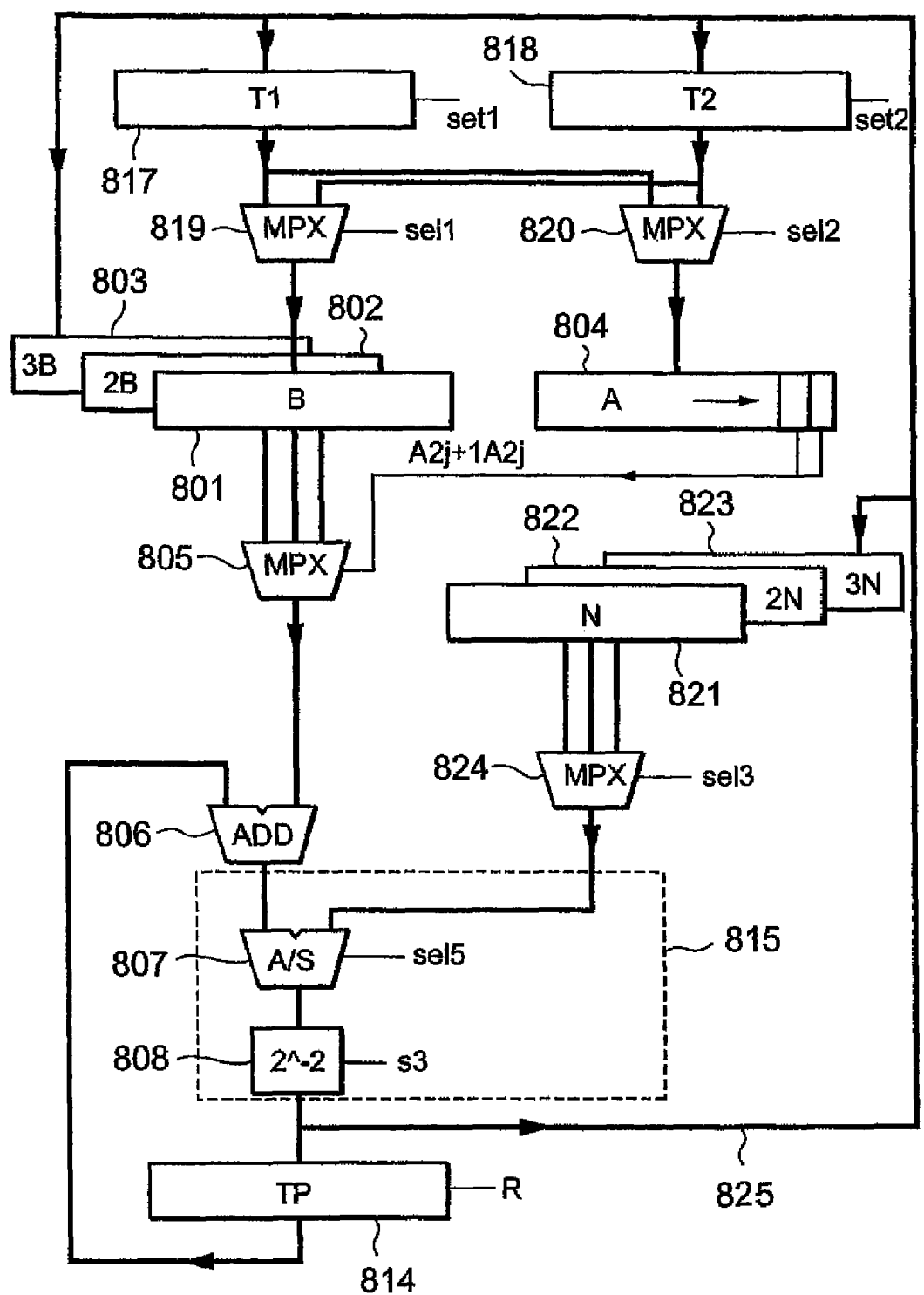
FIG. 8 is a circuit block diagram showing a calculation of an e-th product of a message M according to a third embodiment of the present invention.

A third embodiment according to the present invention will now be described. FIG. 8 is a circuit block diagram showing the third embodiment according to the present invention. The third embodiment has a circuit configuration that the first and second embodiments are more efficiently improved. A main difference of the third embodiment according to the present invention from the second embodiment is that the two stages of processing circuits (615 and 616) are provided in the second embodiment as shown in FIG. 6 whereas one stage of processing circuit (815) is provided in the third embodiment, that reduction in a quantity of circuits and in consumption power can be realized, and that only addition of the modulus N is carried out in the second embodiment whereas addition of 3N to 0 is effected in the third embodiment. Moreover, the structure of the processing circuit 815 is also different. That is, the processing circuit 815 is constituted by an adder 807 and a two-bit right shifter 808, and an AND gate is not used. That is because the third embodiment according to the present invention adopts the mode that inferior two bits of the provisional value u are simultaneously set to 0. Addition of 3N to 0 is performed in the third embodiment for the same reason.

A case and a choice from 3N to 0 depend on how to select the selection signal sel3 by the multiplexer 824. It is assumed that s0 is LSB of the selection signal sel3, s1 is a bit higher by one, and they are expressed as sel3=2s1+s0. A value added in the adder 807 can be expressed as sel3*N. Then, the provisional value u' after addition can be given by the following expression.

$$u'=u+(2A2j+1+A2j)*(2B1+B0)+(2s1+s0)*(2N1+N0) \quad \text{(Expression 13)}$$

Organizing this, the following expression can be obtained.

$$u'=4(A2j+1B1+s1N1)+2(u1+A2jB1+A2j+1B0+s1N0+s0N1)+(u0+A2jB0+s0N0) \quad \text{(Expression 14)}$$

Meanwhile, in Expression 14, since the third bit or higher bits are to be determined, the first term can be ignored here. The third term determines LSB of u'. Since s0 is determined in such a manner that the third term becomes 0, the following expression can be obtained taking into consideration that N is an odd number.

$$s0=u0@A2jB0 \quad \text{(Expression 15)}$$

Considering that the second term in Expression 14 is rendered into 0 by using s0, the following expression can be obtained while taking into account that a carry is generated when making the first term 0.

$$s1=u1@A2jB1@A2j+1B0@N1\_s0 \quad \text{(Expression 16)}$$

It is to be noted that the variable s0 in Expression 15 and the variable s1 in Expression 16 can be determined immediately after start of addition in the adder 806 based on the structures of these expressions.

Figures 9, 10:
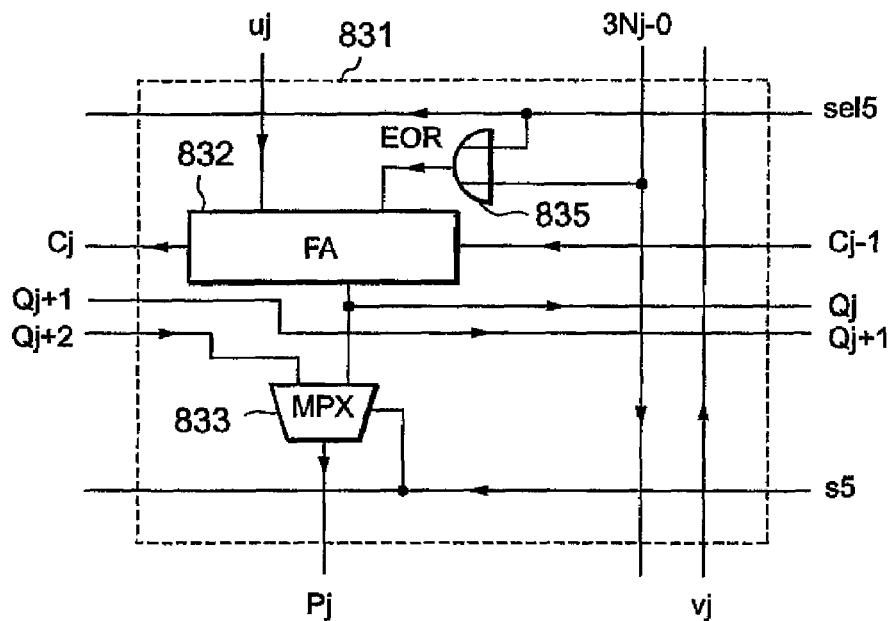
FIG. 9 is a circuit diagram showing the circuit diagram illustrated in FIG. 8 for one bit.
FIG. 10 is a chart showing a calculation of a numeric value 3N.

In order to clarify a difference from the second embodiment, FIG. 9 shows a circuit example corresponding to one bit (j-th bit) of the control circuit 815 illustrated in FIG. 8. This circuit is characterized in that a constituent part corresponding to the AND gate 634 in FIG. 7 is no longer necessary because a value of 3N to 0 is selected in place of the modulus N by the control signal sel3 and that any one of the addition values Qj and Qj+2 is selected by using a control signal s5 of the multiplexer 633 in order to achieve two-bit right shift.

The calculation of 3N is basically the same as the calculation of 3B. FIG. 10 is a chart showing the calculation of 3N. A difference of the calculation of 3N from that of 3B lies in that the control signal sel3 is used in order to select the addition value and that selection of avoiding two-bit right shift is effected by using the control signal s3.

Post-processing in the calculation of the Montgomery product Mont is likewise required in this case. FIG. 11 is a chart showing the value of the register in the calculation of the post processing. It is possible to understand how to perform digit matching by making reference to FIG. 11. The post-processing is required when MSB of the provisional value v is 1, the control signal sel3 is determined so as to select the modulus N, the control signal sel5 is determined so as to select subtraction by the adder/subtracter 807, and the control signal s3 is determined so as not to perform two-bit right shift. As a result, the digit of the provisional value v can be matched with the digit of T1 or T2.

In the third embodiment according to the present invention, when the provisional value u and a selected value sel3*N are added in the adder 807 by using the obtained selection signal sel3=(s1, s0), since provisional value u after addition already has inferior two bits being 0, the multiplication remainder does not vary at all even after performing shift using the two-bit right shifter 808, thereby calculating the Montgomery product Mont based on only accumulation and shift. In addition, like the second embodiment according to the present invention, when calculating the e-th power of the message M shown in the calculation shown in lines 4-9, page 18, or the expression shown in lines 9-16, page 19, provision of the new registers (T1 and T2) can substantially increase the speed of calculation. It is to be noted that the load of pre-processing to newly calculate 3N is generated as well as pre-processing of calculating 3B in advance.

The first embodiment according to the present invention can be further generally extended. This is a method of calculating the Montgomery product of a number to be multiplied A and a multiplier factor B (Expression 4) in a circuit which adds a partial product $\{\Sigma(Aj*B)*2^j \ (j=0, \ldots, m-1)\}$ to a provisional remainder u by using a value of inferior m bits (m is an integer not less than 2) of the number to be multiplied A and the multiplier factor B, by rendering the inferior m bits of the provisional remainder u into 0 by continuously connecting m stages of the processing circuits which perform addition of the modulus N and one-bit shift, then executing right shift of the inferior m bits of the provisional remainder u, and repeating this processing. In this method, although a multiple number of the multiplier factor B is required as pre-processing, shift based on a change in connection is used with respect to a $2^j$-fold value, and any other value must be calculated in the pre-processing.

The second embodiment, which calculates the e-th power of ,massage M (C=M^e), can be generally extended easily by setting up a new register (T1 and T2) with the first extended embodiment.

In addition, the third embodiment according to the present invention can be also further generally extended. This is a method of calculating the Montgomery product of a number to be multiplied A and a multiplier number B (Expression 4), in a circuit which adds a partial product $\{\Sigma(Aj*B)*2^j \ (j=0, \ldots, m-1)\}$ to a provisional remainder u by using a value of inferior m bits (m is an integer not less than 2) of the number to be multiplied A and the multiplier factor B, by rendering the inferior m bits of the provisional remainder u into 0 by adding a multiple number $\{\Sigma(sj*N)*2^j \ (j=0, \ldots, m-1)\}$ of the modulus N, then executing right shift of the inferior m bits of the provisional remainder u, and repeating the above-described processing. In this method, a multiple number of the modulus N is also required as pre-processing, but shift based on a change in connection is used with respect to a $2^j$-fold value, and any other value must be calculated in the pre-processing.

According to the first embodiment of the present invention, since the binary shift addition method is inefficient because of processing for each one bit when calculating the Montgomery product Mont, the method of simultaneously processing a plurality of bits is newly proposed in the first embodiment. As a result, the speed of the calculation of the Montgomery product Mont can be increased to be several-fold of that of the conventional method and the merits of the Montgomery method can be obtained. According to the second embodiment of the present invention, in the calculation of the e-th power of the message M (C=M^e), it is possible to conceive of the method which can substantially increase the speed of the calculation by providing the new registers (T1 and T2). Additionally, according to the third embodiment of the present invention, the number of stages of the processing circuits can be decreased by adding a value which is several-fold of the modulus N, and further reduction in a quantity of circuits and in power consumption can be achieved as compared with the second embodiment. Further, like the first embodiment, the speed of the calculation of the Montgomery product Mont can be increased to be several-fold of that in the prior art method, and merits of the Montgomery method can be obtained.

What is claimed is:

1. A multiplication remainder calculator which shifts inferior m bits of a provisional remainder u by continuously connecting m stages of processing circuits which execute addition of a modulus N and one-bit shift, and calculates a Montgomery product of a number to be multiplied A and a multiplier factor B by repeating this processing, in a circuit which adds a partial product $\{\Sigma(Aj*B)*2^j (j=0,,,m-1)\}$ to the provisional remainder u by using a value of inferior m bits (m is an integer not less than 2) of the number to be multiplied A, and the multiplier factor B, wherein a multiple number of the multiplier factor B is calculated by inhibiting one-bit shift of the processing circuits, the multiplication remainder calculator comprising:

a temporary register, connected to the processing circuits, that stores a feedback value output from the processing circuits and that generates a new provisional value;

a register that stores the multiplier factor B;

an m-bit right shift register that stores the number to be multiplied A;

a multiplexer, connected to the register and the m-bit right shift register, that generates a multiplexed signal based on the inferior m bits of the number to be multiplied A, and the multiplier factor B; and an adder, connected to the multiplexer and the temporary register, that adds the new provisional value and the multiplexed signal to generate an addition signal, and that provides the addition signal to the processing circuits for addition to the modulus N.

2. The multiplication remainder calculator according to claim 1, wherein a bit number of the provisional remainder u is restored to an n-bit value by performing subtraction of the modulus N and one-bit shift inhibition, and the Montgomery product is repeatedly calculated by using the n-bit value.

3. A multiplication remainder calculator comprising a plurality of second registers and second multiplexers, wherein a Montgomery product calculated by the multiplication remainder calculator according to claim 2 is repeatedly stored in the second registers, and a remainder of an e-th power of a message M is calculated.

* * * * *